(12) United States Patent
Saito

(10) Patent No.: US 9,024,538 B2
(45) Date of Patent: May 5, 2015

(54) DISCHARGE LAMP LIGHTING DEVICE, PROJECTOR, AND METHOD OF CONTROLLING PROJECTOR

(75) Inventor: Osamu Saito, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 431 days.

(21) Appl. No.: 13/563,559

(22) Filed: Jul. 31, 2012

(65) Prior Publication Data

US 2013/0033684 A1 Feb. 7, 2013

(30) Foreign Application Priority Data

Aug. 1, 2011 (JP) ................................. 2011-168076

(51) Int. Cl.

| G05F 1/00 | (2006.01) |
|---|---|
| H05B 37/02 | (2006.01) |
| G03B 21/20 | (2006.01) |
| H05B 41/288 | (2006.01) |
| H05B 41/38 | (2006.01) |
| G03B 21/00 | (2006.01) |
| G03B 33/06 | (2006.01) |

(52) U.S. Cl.
CPC ........... *G03B 21/2026* (2013.01); *Y02B 20/204* (2013.01); *H05B 41/2881* (2013.01); *H05B 41/384* (2013.01); *Y02B 20/206* (2013.01); *G03B 21/006* (2013.01); *G03B 33/06* (2013.01)

(58) Field of Classification Search
None
See application file for complete search history.

(56) References Cited

U.S. PATENT DOCUMENTS

| 2003/0015972 | A1 | 1/2003 | Suzuki | |
|---|---|---|---|---|
| 2009/0322245 | A1 | 12/2009 | Horikawa | |
| 2010/0109573 | A1* | 5/2010 | Ichikawa et al. | 315/307 |
| 2010/0327776 | A1* | 12/2010 | Yufuku et al. | 315/307 |
| 2011/0234997 | A1* | 9/2011 | Saito et al. | 353/85 |

FOREIGN PATENT DOCUMENTS

| JP | 06-111965 A | 4/1994 |
|---|---|---|
| JP | H11-176583 A | 7/1999 |
| JP | 2001-118691 A | 4/2001 |
| JP | 2003-092197 A | 3/2003 |
| JP | 2008-277082 A | 11/2008 |
| JP | 2010-010074 A | 1/2010 |
| JP | 2010-192196 A | 9/2010 |

* cited by examiner

*Primary Examiner* — Jany Richardson
(74) *Attorney, Agent, or Firm* — Maschoff Brennan

(57) ABSTRACT

A discharge lamp lighting device according to the invention can reliably light a discharge lamp, and at the same time, prevent output of unnecessary high-voltage pulses with a simple circuit configuration. The discharge lamp lighting device includes a capacitor charged with a current from a direct-current power supply, a transformer adapted to output a starting pulse between electrodes of the discharge lamp in accordance with a discharge current flowing from the capacitor, a discharge control circuit adapted to switch ON/OFF the discharge current from the capacitor to the transformer, and a timing generation section adapted to switch the discharge control circuit to ON after a voltage between both ends of the capacitor has reached a reference voltage. The timing generation section can operate in accordance with a plurality of reference voltages.

11 Claims, 5 Drawing Sheets

DISCHARGE LAMP LIGHTING DEVICE, PROJECTOR, AND METHOD OF CONTROLLING PROJECTOR

BACKGROUND

1. Technical Field

The invention relates to a discharge lamp lighting device for lighting a discharge lamp, a projector equipped with the discharge lamp lighting device, and a method of controlling the projector.

2. Related Art

In general, a discharge lamp lighting device for lighting a discharge lamp such as a metal halide lamp used for a light source of a projector has lighted the discharge lamp by applying a high-voltage starting pulse to the discharge lamp. Although it is known that the voltage necessary for lighting the discharge lamp is different depending on the state of the discharge lamp, in the past, there has been adopted the configuration of always outputting the high-voltage pulse with which the discharge lamp can be lighted in any circumstances. Since the higher the voltage of the pulse is, the more the deterioration of the peripheral components is accelerated, and the more probably the noise source is caused, it is preferable to suppress output of the high-voltage pulse to the minimum necessary. Therefore, there has been proposed a discharge lamp lighting device of being provided with a plurality of starting pulse generation circuits using transformers to thereby output the starting pulses with respective voltages different from each other (see, e.g., JP-A-6-111965 (Document 1)).

However, the discharge lamp lighting device described in Document 1 is provided with a plurality of starting pulse generation circuits with transformers, and therefore, incurs complication of the circuit configuration, which causes a problem of making downsizing difficult.

SUMMARY

An advantage of some aspects of the invention is to provide a discharge lamp lighting device and a projector each capable of surely lighting the discharge lamp with a simple circuit configuration, and preventing output of unnecessary high-voltage pulses.

An aspect of the invention is directed to a discharge lamp lighting device including a capacitance charged with a current from a direct-current power supply, a transformer having a primary coil connected to the capacitance, and a secondary coil connected to electrodes of a discharge lamp, and adapted to output a starting voltage between the electrodes of the discharge lamp in accordance with a discharge current flowing from the capacitance through the primary coil, a switching circuit adapted to switch ON/OFF the discharge current from the capacitance to the transformer, and a discharge control section adapted to switch the switching circuit to ON after a voltage between both ends of the capacitance has reached a reference voltage, wherein the discharge control section is capable of operating in accordance with a plurality of reference voltages.

According to this aspect of the invention, since it is possible to vary the starting voltage applied between the electrodes of the discharge lamp by selectively using the plurality of reference voltages for appropriate purposes, it becomes possible to perform the control of, for example, outputting a high starting voltage in the condition in which the discharge lamp is difficult to light such as the hot restart, and outputting a relatively low starting voltage in the condition in which the discharge lamp is easy to light. Therefore, it is possible to reliably light the discharge lamp while preventing output of unnecessary high-voltage pulses without incurring complication of the circuit configuration.

Another aspect of the invention is directed to the discharge lamp lighting device described above, wherein the discharge control section discharges the capacitance in accordance with higher one of the reference voltages one of after a number of times that the capacitance is discharged in accordance with lower one of the reference voltage reaches a predetermined number of times, and after operating in accordance with the lower one of the reference voltages for a predetermined period of time.

According to this aspect of the invention, since the discharge control section switches the discharge to the transformer to ON to thereby generate the high voltage in the condition in which the voltage between the both ends of the capacitance is low and applies the starting voltage a predetermined number of times to the discharge lamp, and then switches the discharge to the transformer to ON in the condition in which the voltage between the both ends of the capacitance is high to thereby apply the higher starting voltage, it is possible to prevent the unnecessary high-voltage pulses, and at the same time, to reliably light the discharge lamp which does not light with the initial starting voltage.

Still another aspect of the invention is directed to the discharge lamp lighting device described above, wherein the discharge control section selectively uses the reference voltages based on temperature of the discharge lamp.

According to this aspect of the invention, since the starting voltage applied to the discharge lamp is switched based on the temperature of the discharge lamp, it is possible to prevent generation of unnecessary high-voltage pulse in the case in which the discharge lamp can be lighted with a lower voltage, and at the same time, to reliably light the discharge lamp in the case in which a higher voltage is required.

Yet another aspect of the invention is directed to the discharge lamp lighting device described above, which further includes an alternating-current conversion circuit adapted to convert the direct-current voltage into an alternating-current voltage, and then output the alternating-current voltage between the electrodes of the discharge lamp, wherein the switching circuit keeps the discharge current from the capacitance to the transformer in OFF after lighting the discharge lamp.

According to this aspect of the invention, since no starting voltage is applied after lighting the discharge lamp, the unnecessary high-voltage pulse can be prevented from occurring.

Still yet another aspect of the invention is directed to the discharge lamp lighting device described above, wherein the switching circuit includes an output control capacitance charged with a current from the direct-current power supply, and a thyristor connected in series to the capacitance and the primary coil of the transformer, and adapted to electrically connect the both ends of the capacitance and the primary coil to each other when a voltage between both ends of the output control capacitance has reached a predetermined voltage, and the discharge control section starts to charge the output control capacitance at a timing when the voltage between the both ends of the capacitance has reached the reference voltage.

According to this aspect of the invention, the discharge current to the transformer can be controlled with a simple configuration using the capacitor to be charged with the current from the direct-current power supply, and the thyristor driven by the voltage between the both ends of the capacitor.

Further another aspect of the invention is directed to a projector including a discharge lamp provided with a pair of electrodes, a modulation section adapted to modulate light emitted by the discharge lamp, a projection optical system adapted to project the light modulated by the modulation section on a projection surface, and the discharge lamp lighting device described above connected to the discharge lamp.

According to this aspect of the invention, since the discharge lamp lighting device capable of varying the starting voltage applied between the electrodes of the discharge lamp is provided, it is possible to reliably light the discharge lamp, and at the same time, to prevent unnecessary high-voltage pulses from occurring in the discharge lamp lighting device. Thus, the influence of the noise generated by the discharge lamp lighting device inside the projector can be reduced, and therefore, the configuration against noise can be simplified. Therefore, further downsizing and weight saving can be realized.

According to the above aspects of the invention, by selectively using the plurality of reference voltages for appropriate purposes, it is possible to reliably light the discharge lamp while preventing output of unnecessary high-voltage pulses without incurring complication of the circuit configuration.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Hereinafter, embodiments of the invention will be described with reference to the accompanying drawings.
1. Circuit Configuration of Discharge Lamp Lighting Device FIG. 1 is a circuit diagram of a discharge lamp lighting device 1 according to a first embodiment of the invention.

Figure 1:
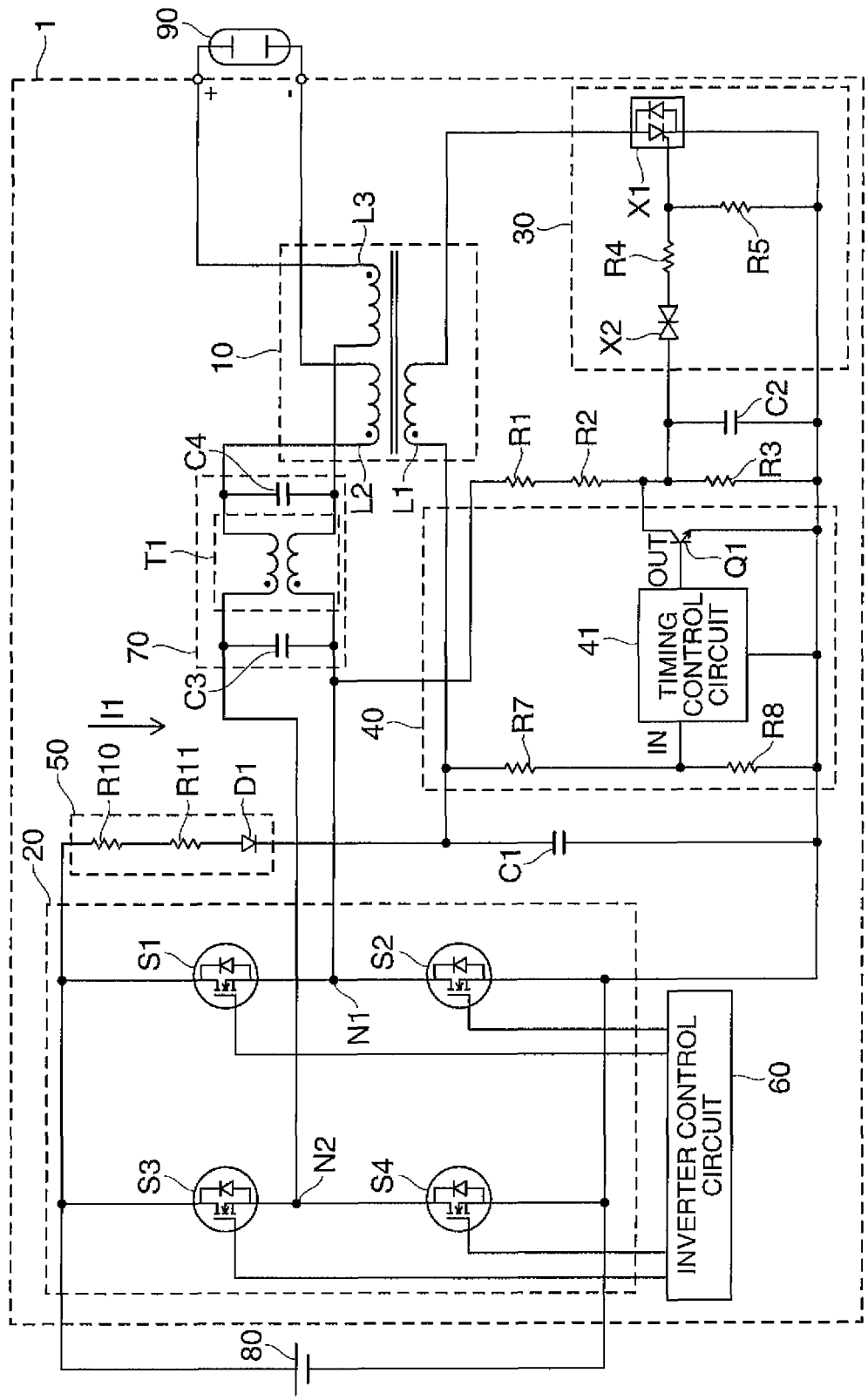
FIG. 1 is a circuit diagram of a discharge lamp lighting device according to a first embodiment of the invention.

The discharge lamp lighting device 1 shown in FIG. 1 is a discharge lamp lighting device connected to a direct-current power supply 80, outputting a voltage pulse between electrodes of a discharge lamp 90 from a secondary coil of a transformer 10 to thereby start lighting of the discharge lamp 90, and then outputting an alternating-current drive current between the electrodes of the discharge lamp 90 using an alternating-current converter circuit 20 for performing alternating-current conversion on the current from the direct-current power supply 80 to thereby drive the discharge lamp 90.

The direct-current power supply 80 is formed of a down chopper circuit or the like, and supplies a power supply voltage in a range of, for example, 300V through 400V. The transformer 10 is provided with a primary coil L1 and secondary coils L2, L3, and in the case of, for example, setting the turn ratio between the coils to L1:L2:L3=1:10:10, a voltage ten times as high as the voltage generated by the current flowing through the coil L1 is generated in each of the coils L2, L3, and a voltage pulse with a voltage corresponding to a value 20 times as high as the voltage generated in the coil L1 is output between the electrodes of the discharge lamp 90.

The alternating-current conversion circuit 20 inputs the direct current output from the direct-current power supply 80, and reverses the polarity of the direct current at predetermined timing to thereby generate and output an alternating-current drive current I for driving the discharge lamp having arbitrarily duty ratio and frequency. In the present embodiment, the alternating-current conversion circuit 20 is formed of an inverter bridge circuit (a full bridge circuit).

The alternating-current conversion circuit 20 of the present embodiment is provided with switch elements S1 through S4 formed of a transistor and so on, and is configured by connecting the switch elements S1, S2 connected in series and the switch elements S3, S4 connected in series in parallel to each other. To the control terminals of the switch elements S1 through S4, there are input control signals respectively from an inverter control circuit 60, and ON/OFF of the switch elements S1 through S4 are controlled by the inverter control circuit 60. The inverter control circuit 60 switches ON/OFF ones diagonally located out of the switch elements S1 through S4 at a high frequency (e.g., several tens kHz) until the discharge lamp 90 lights, then performs the switching at a low frequency (e.g., 1 kHz or lower) after the discharge lamp 90 lights. Specifically, the inverter control circuit 60 performs the control of switching OFF the switch elements S2, S3 while the switch elements S1, S4 are ON, and switching ON the switch elements S2, S3 while the switch elements S1, S4 are OFF. While the switch elements S1, S4 are ON, there occurs a drive current flowing from the positive side of the direct-current power supply 80 to the switch element S1, the coil L3, the discharge lamp 90, the coil L2, and the switch element S4 in this order. Further, while the switch elements S2, S3 are ON, there occurs a drive current flowing from the positive side of the direct-current power supply 80 to the switch element S3, the coil L2, the discharge lamp 90, the coil L3, and the switch element S2 in this order. Thus, the polarity of the direct current output from the direct-current power supply 80 is reversed alternately to thereby generate the alternating-current drive current I having controlled frequency, duty ratio, and so on, and then output it from two output terminals composed of a common node N1 of the switch elements S1, S2 and a common node N2 of the switch elements S3, S4, and then the alternating-current drive current I is supplied to the discharge lamp 90.

The inverter control circuit 60 can have a configuration of performing the switching control described above using dedicated hardware, or a configuration of performing a variety types of control including the switching control described above by a central processing unit (CPU) executing a control program stored in a memory or the like.

Further, between the coils L2, L3 of the transformer 10 and the output terminals N1, N2 of the alternating-current conversion circuit 20, there is disposed a filter 70. The filter 70 is provided for reducing the influence exerted on the alternating-current conversion circuit 20 by the voltage pulse generated and output by the transformer 10 due to the operation described later. In the example shown in FIG. 1, the filter 70 is configured including a transformer T1, and capacitors C3, C4, and attenuates the voltage variation between the output terminals N1, N2 of the alternating-current conversion circuit 20.

To the both ends of the direct-current power supply 80, there is connected a capacitor C1 (capacitance) charged based on the current from the direct-current power supply 80 in series with a current limiting circuit 50. The current limiting circuit 50 is a circuit for limiting the current value of the charging current I1 from the direct-current power supply 80 to the capacitor C1 to a desired value if necessary, and the capacitor C1 is charged with the direct current supplied via the current limiting circuit 50. In the example of FIG. 1, the current limiting circuit 50 is composed of a current limiting resistors R10, R11, and a diode D1 connected in series to each other, and the capacitor C1 is connected to the cathode side of the diode D1. To the both ends of the capacitor C1, there is connected the coil L1 of the transformer 10, and when discharging the charge stored in the capacitor C1, the transformer 10 generates a starting pulse as described later.

The discharge lamp lighting device 1 is provided with a capacitor C2 (output control capacitance) connected between the common node N1 of the switch elements S1, S2 as one of the output terminals of the alternating-current conversion circuit 20 and the negative side of the direct-current power supply 80, and charged with the output current of the alternating-current conversion circuit 20. In the example of FIG. 1, between the node N1 and the negative side of the direct-current power supply 80, there are connected voltage-dividing resistors R1, R2, and R3 in series to each other, and the capacitor C2 is connected in parallel to the resistor R3 and is charged with the output voltage of the alternating-current conversion circuit 20 thus divided. The voltage between the both ends of the capacitor C2 is limited to an arbitrary value by the resistance values of the resistors R1 through R3.

To the both ends of the capacitor C2, there is connected a discharge control circuit 30 (switching circuit). The discharge control circuit 30 discharges the charge stored in the capacitor C1 as a discharge current via the primary coil L1 of the transformer 10 after the voltage Vc2 between the both ends of the capacitor C2 exceeds a reference voltage Vth1. Specifically, the discharge control circuit 30 is provided with a thyristor X1 connected between one end of the capacitor C2 and the coil L1, and a diac X2 connected to the other end of the capacitor C2 and the gate of the thyristor X1. Between the diac X2 and the thyristor X1, there is disposed a resistor R4 in series to the diac X2, and one end of the resistor R4 is connected to the one end of the capacitor C2 via a resistor R5. The thyristor X1 forms a part of a discharge path through which the discharge current of the capacitor C1 flows through the coil L1.

The diac X2 as a trigger diode is switched from OFF to ON in response to the voltage Vc2 between the both ends of the capacitor C2 exceeding the reference voltage Vth1 determined by the specification of the diac X2. Thus, the charge stored in the capacitor C2 is discharged as a current, and a part of the current is supplied to the gate of the thyristor X1 via the diac X2 and the resistor R4 while the rest of the current is discharged to the ground potential via the resistor R5.

The thyristor X1 is switched from OFF to ON taking the current supplied to the gate as a trigger, and discharges the charge stored in the capacitor C1 to the ground potential via the primary coil L1 of the transformer 10 as a discharge current. Further, when the current flowing from the capacitor C1 to the thyristor X1 decreases to a level equal to or lower than the holding current determined by the specification of the thyristor X1, the thyristor X1 is switched from ON to OFF, the discharge from the capacitor C1 stops, and the charge starts again.

Further, when the discharge current flows through the primary coil L1 of the transformer 10, the voltage corresponding to the turn ratio of the secondary coils L2, L3 of the transformer 10 is generated by the current, and then output between the electrodes of the discharge lamp 90 as a voltage pulse.

As described above, the discharge lamp lighting device 1 according to the present embodiment is capable of outputting the voltage pulse between the electrodes of the discharge lamp 90 taking the timing at which the voltage Vc2 between the both ends of the capacitor C2 exceeds the reference voltage Vth1 as a trigger.

Further, the capacitor C2 is charged based on the current from one of the output terminals of the alternating-current conversion circuit 20, and is therefore charged only in one (the period in which the switch elements S1, S4 is ON in the example shown in FIG. 1) of the polarity periods of the alternating-current drive current I. Therefore, the timing at which the voltage between the both ends of the capacitor C2 exceeds the reference voltage Vth1 is affected by the polarity reversion timing of the alternating-current drive current I. In other words, by appropriately setting the value of the capacitor C2, it is possible to output the voltage pulse between the electrodes of the discharge lamp 90 at desired timing based on the polarity reversion timing of the alternating-current drive current I.

Further, since the capacitor C2 has a charging path different from that of the capacitor C1, by appropriately setting the value of the capacitor C2, it is possible to output the voltage pulse between the electrodes of the discharge lamp 90 at desired timing without restrictions by the value of the capacitor C1.

Further, the discharge lamp lighting device 1 according to the present embodiment is provided with a timing generating section 40 (a discharge control section) for controlling the timing of starting to charge the capacitor C2. The timing generation section 40 controls starting and stopping to charge the capacitor C2 in accordance with the voltage between the both ends of the capacitor C1.

In the example of FIG. 1, the timing generation section 40 is configured including a transistor Q1, resistors R7, R8, and a timing control circuit 41. To the input terminal of the timing control circuit 41, there is input the voltage between the both ends of the capacitor C1 after voltage-divided by the resistors R7, R8, and the output terminal of the timing control circuit 41 is connected to the base of the transistor Q1. The timing control circuit 41 switches the output to the transistor Q1 between LOW and HIGH in accordance with whether or not the voltage between the both ends of the capacitor C1 monitored based on the voltage divided by the resistors R7, R8 exceeds the reference voltage. During the period in which the output of the timing control circuit 41 is HIGH, the capacitor C2 is not charged since the transistor Q1 is switched to ON to thereby short the both ends of the capacitor C2. During the period in which the output of the timing control circuit 41 is LOW, the transistor Q1 is switched to OFF, and thus, the capacitor C2 is charged.

The timing control circuit 41 is configured so as to be able to set a plurality of levels of reference voltages, and in the present embodiment, two levels of reference voltages, namely a first reference voltage V1 and a second reference voltage V2 higher than the first reference voltage V1, are set. The values of the reference voltages are determined based on the voltage between the both ends of the capacitor C1 and the voltage-dividing ratio of the resistors R7, R8. In the case of using the second reference voltage V2 with the higher voltage, the current with the higher voltage flows through the coil L1 compared to the case of using the first reference voltage V1. Since the capacitor C1 is discharged at the time point when the capacitor C1 is charged to have the voltage between the both ends thereof corresponding to the reference voltage, if the reference voltage is too low, the capacitor C1 is discharged before the voltage between the both ends thereof substantially rises, and therefore, a pulse with a voltage unable to start the discharge lamp 90 is output. Therefore, the first reference voltage V1 is determined to have a level capable of generating the starting pulse with a voltage higher than the lowest necessary voltage for starting the discharge lamp 90.

The discharge lamp 90 such as a metal halide lamp can be lighted by applying the starting pulse with a relatively low voltage in the case of lighting it in the cool-temperature state (so called cold start), but requires the starting pulse with a high voltage in the case of lighting it in the high-temperature state (so called hot restart) such as a case immediately after distinction. Therefore, the timing control circuit 41 successfully prevents output of unnecessary high-voltage pulses by varying the voltage of the starting pulse output from the transformer 10 to the discharge lamp 90 using, a plurality of reference voltages, for example, the first reference voltage V1 for cold start and the second reference voltage V2 for hot restart.

Further, in the discharge lamp lighting device 1, the current limiting circuit 50 can be provided with the configuration of limiting the charging current I1 flowing into the capacitor C1 to a lower current value than the holding current of the thyristor X1. In this case, it is possible to surely switch OFF the thyristor X1. Since the charging current I1 is not used for charging the capacitor C2, the change in the current value of the charging current I1 does not affect the time necessary for charging the capacitor C2. Therefore, it is possible to design the value of the charging current I1 independently of the value of the capacitor C2.

2. Lighting Operation

FIGS. 2A through 2D are timing charts for explaining an operation example of the discharge lamp lighting device 1 according to the present embodiment.

Figure 2:
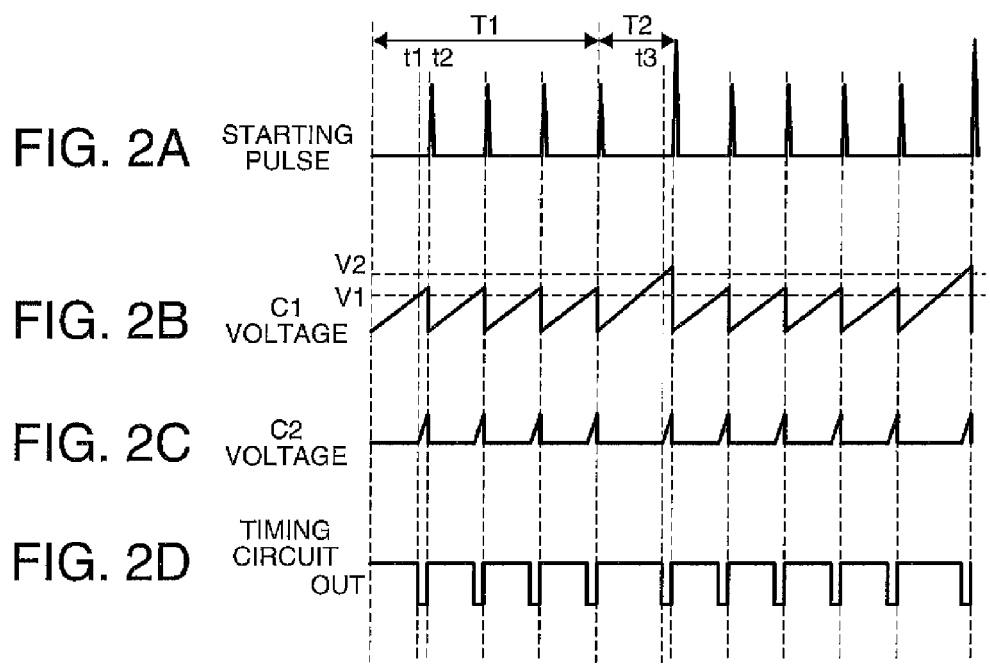
FIGS. 2A through 2D are timing charts for explaining an operation example of the discharge lamp lighting device.

FIG. 2A shows the voltage of the pulse (the starting pulse) applied between the electrodes of the discharge lamp 90, FIG. 2B shows the voltage between the both ends of the capacitor C1, FIG. 2C shows the voltage between the both ends of the capacitor C2, and FIG. 2D shows the output voltage of the timing control circuit 41.

In the initial state after starting the operation, the reference voltage of the timing control circuit 41 is set to the first reference voltage V1. The output of the timing control circuit 41 shown in FIG. 2D is set to HIGH in the initial state, and the capacitor C2 is not charged during this period, and therefore, the voltage between the both ends of the capacitor C2 shown in FIG. 2C does not rise but is kept constant. In contrast, since the capacitor C1 is continuously charged, the voltage between the both ends of the capacitor C1 shown in FIG. 2B rises gradually.

When the voltage between the both ends of the capacitor C1 exceeds the first reference voltage V1 (time t1), the timing control circuit 41 reverses the output to LOW, and charging of the capacitor C2 is started. Then, when the voltage between the both ends of the capacitor C2 reaches the voltage value for switching the diac X2 to ON (time t2), the diac X2 is switched to ON to thereby switch the thyristor X1 to ON, and thus, the charge stored in the capacitor C1 flows through the primary coil L1 of the transformer 10 to thereby output the starting pulse to the discharge lamp 90.

When the voltage between the both ends of the capacitor C1 decreases to a level lower than the first reference voltage V1 due to the discharge of the capacitor C1, the timing control circuit 41 switches the output to HIGH. The voltage between the both ends of the capacitor C2 decreases due to the discharge, and is then kept roughly constant since the capacitor C2 is not charged during the period in which the output of the timing control circuit 41 is HIGH. Since charging of the capacitor C1 is started, the voltage between the both ends of the capacitor C1 rises gradually. When the voltage between the both ends of the capacitor C1 exceeds the first reference voltage V1, the operation between the time points t1 and t2 is performed again to thereby output the starting pulse to the discharge lamp 90.

Further, the timing control circuit 41 incorporates a counter for counting the number of times of outputting the starting pulse to the discharge lamp 90, and specifically counts the number of times of switching the output to LOW at the time t1. Then, when the number of times of switching from HIGH to LOW reaches the value set previously, the reference voltage is switched from the first reference voltage V1 and set to the second reference voltage V2 with a higher voltage. In the present embodiment, there is adopted the configuration of setting the reference voltage to the second reference voltage V2 when the count value reaches 4. Therefore, the timing control circuit 41 operates based on the first reference voltage V1 during the period T1 until the fourth starting pulse is output, and then operates based on the second reference voltage V2 during the period T2 until the subsequent starting pulse is output.

The fifth starting pulse is output when the voltage between the both ends of the capacitor C1 exceeds the second reference voltage V2 (time t3). On this occasion, since the discharge current with a higher voltage flows through the coil L1 of the transformer 10, the starting pulse with a higher voltage is applied to the discharge lamp 90.

Since the discharge lamp 90 lights with the relatively low starting voltage in the cold start as described above, the discharge lamp 90 is lighted by either one of the first through fourth starting pulses. In contrast, since a high starting voltage is required in the hot restart, the discharge lamp 90 is lighted by the fifth starting pulse although there is a possibility that the discharge lamp 90 fails to be lighted by the first through fourth starting pulses. As described above, by suppressing the voltage of the starting pulses output in the initial period to a low level, output of unnecessary high-voltage pulses can be prevented. Further, in the case in which the discharge lamp 90 fails to light after outputting a predetermined number of starting pulses, the starting pulse with a higher voltage is output, and therefore, the discharge lamp 90 can surely be lighted.

The count value of the starting pulses output until the timing control circuit 41 switches the reference voltage from the first reference voltage V1 to the second reference voltage V2 can arbitrarily be set, and is not limited to 4 described in the present embodiment as an example, but can be a smaller number, or can be set to a larger number. It is possible to appropriately set the number based on the voltage between the both ends of the capacitor C1, the voltage of the starting pulses output by the transformer 10, and the characteristics of the starting voltage of the discharge lamp 90 in the cold start and the hot restart.

Further, although the case of counting the number of times that the timing control circuit 41 switches the output value from HIGH to LOW is explained in the example described above, it is also possible to adopt the configuration in which the timing control circuit 41 measures the time from the start of the operation, namely the start of outputting HIGH, and sets the reference voltage to a higher voltage when the time reaches the time set previously. In this case, by arranging that the second reference voltage V2 is set when the period T1 has elapsed, substantially the same advantage as described above can be obtained.

The discharge lamp lighting device 1 has the configuration in which the output of the voltage pulse automatically stops after starting the lighting of the discharge lamp 90. Here, the explanation will be presented taking the case in which the output voltage of the direct-current power supply 80 before starting the lighting of the discharge lamp 90 is 380V while the inter-electrode voltage (the lamp voltage) of the discharge lamp 90 after starting the lighting of the discharge lamp 90 is 70V as an example. It should be noted that the explanation will be presented assuming that the voltage drop due to the switch elements S1 through S4 is sufficiently smaller than the output voltage of the direct-current power supply 80 and the inter-electrode voltage of the discharge lamp 90.

If the ratio of the resistors R1 through R3 is set approximately to (R1+R2):R3=7.5:1 before starting the lighting of the discharge lamp 90, the voltage applied to the both ends of the capacitor C2 is about 45V at most. In this case, if the reference voltage (the trigger voltage of the diac X2) Vth1 is set to, for example, about 32V, the diac X2 and the thyristor X1 are switched to the ON state by charging the capacitor C2, and the discharge lamp lighting device 1 generates the voltage pulse.

After starting the lighting of the discharge lamp 90, (the output voltage of the direct-current power supply 80)≈(the inter-electrode voltage of the discharge lamp 90) is fulfilled. In this case, since the voltage applied to the both ends of the capacitor C2 is about 8V at most, if the capacitor C2 is charged, it is not achievable for the voltage between the both ends thereof to exceed the reference voltage Vth1. Therefore, there is no chance for the diac X2 to be switched to the ON state, and the discharge lamp lighting device 1 stops to output the voltage pulse.

Further, after starting the lighting of the discharge lamp 90, rise in the voltage between the both ends of the capacitor C1 is also prevented due to the drop of the output voltage of the direct-current power supply 80. Therefore, if, for example, the first reference voltage V1 and the second reference voltage V2 of the timing control circuit 41 are the voltages sufficiently higher than the voltage between the both ends of the capacitor C1 having been charged based on the direct-current power supply 80 after the lighting, or the value obtained by voltage-dividing the voltage between the both ends with the resistors R7, R8, the state of stopping the charging of the capacitor C2 is kept.

Figure 3:
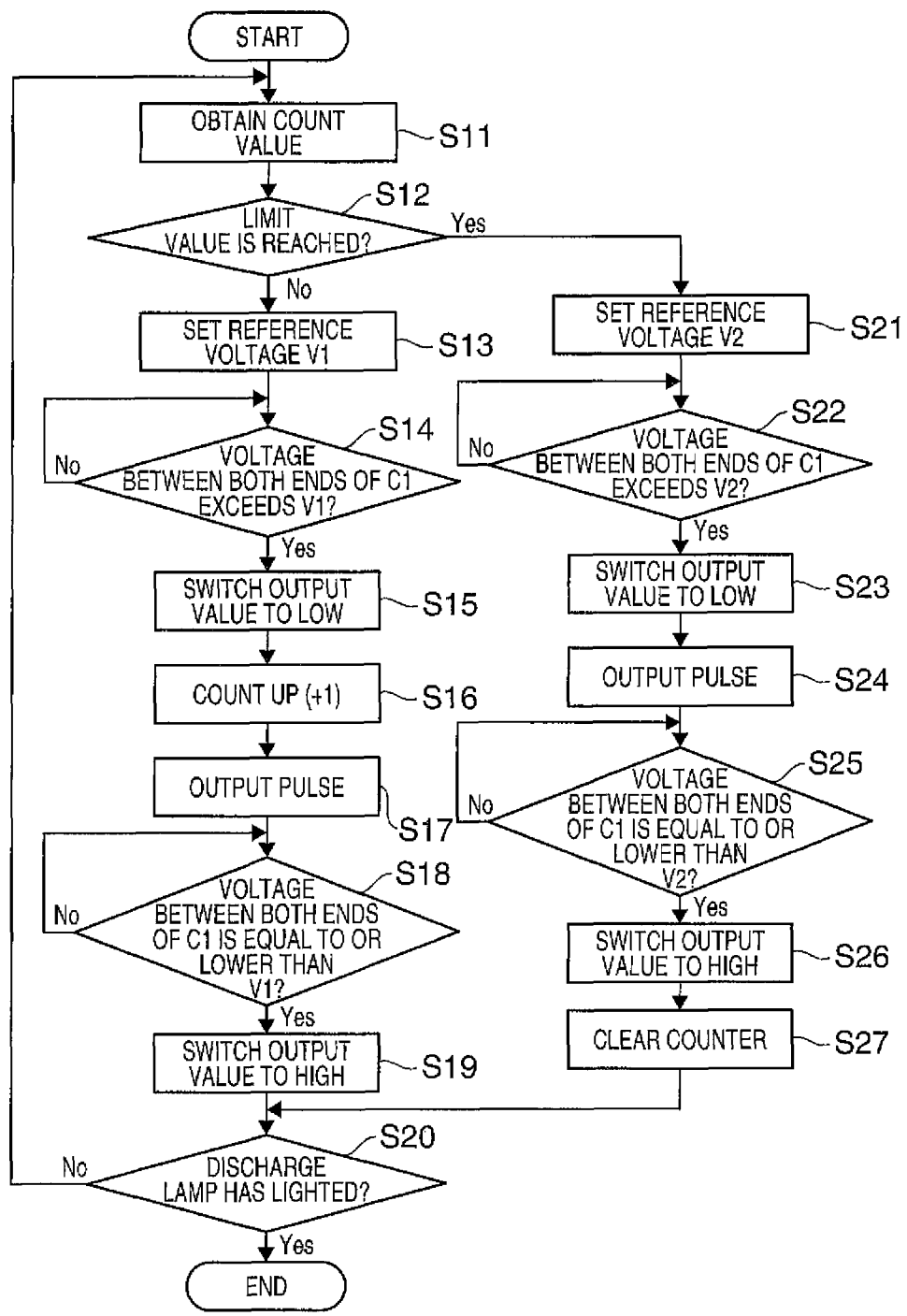
FIG. 3 is a flowchart showing an operation of the discharge lamp lighting device.

FIG. 3 is a flowchart showing the operation of the discharge lamp lighting device 1.

The timing control circuit 41 obtains (step S11) the count value of the counter incorporated therein, and then determines (step S12) whether or not the count value reaches a limit value set previously. If the count value has not yet reached the limit value (4 in the example described above) (NO in the step S12), the timing control circuit 41 sets (step S13) the first reference voltage V1 as the reference voltage, and waits (step S14) until the voltage between the both ends of the capacitor C1 exceeds the first reference voltage V1 while monitoring the voltage between the both ends of the capacitor C1.

When the voltage between the both ends of the capacitor C1 exceeds the first reference voltage V1 (YES in the step S14), the timing control circuit 41 switches (step S15) the output value from HIGH to LOW, and counts up (+1) (step S16) the counter value of the counter incorporated therein. Here, the thyristor X1 is switched to ON due to the operation described above, and the starting pulse is output (step S17) from the transformer 10. The timing control circuit 41 continues (step S18) to monitor the voltage between the both ends of the capacitor C1, and switches (step S19) the output value to HIGH if the voltage between the both ends drops to a level equal to or lower than the first reference voltage V1 (YES in the step S18), and then determines (step S20) whether or not the discharge lamp 90 has lighted. If the discharge lamp 90 has lighted (YES in the step S20), the timing control circuit 41 stops the operation, and if it has not (NO in the step S20), the process returns to the step S11.

It should be noted that since the circuit of the discharge lamp lighting device 1 has the configuration of stopping the output of the starting pulse after the discharge lamp 90 has lighted as described above, the determination in the step S20 is not required for the operation. However, here the case in which the timing control circuit 41 detects lighting of the discharge lamp 90, and then automatically stops the operation will be exemplified.

On the other hand, if the count value of the counter incorporated in the timing control circuit 41 has reached the limit value (YES in the step S12), the timing control circuit 41 sets (step S21) the second reference voltage V2 as the reference voltage, and then waits (step S22) until the voltage between the both ends of the capacitor C1 exceeds the second reference voltage V2.

When the voltage between the both ends of the capacitor C1 exceeds the second reference voltage V2 (YES in the step S22), the timing control circuit 41 switches (step S23) the output value from HIGH to LOW. Here, the thyristor X1 is switched to ON due to the operation described above, and the starting pulse is output (step S24) from the transformer 10. The timing control circuit 41 continues (step S25) to monitor the voltage between the both ends of the capacitor C1, and switches (step S26) the output value to HIGH if the voltage between the both ends drops to a level equal to or lower than the second reference voltage V2 (YES in the step S25), and then clears (step S27) the count value of the counter, and then the process proceeds to the step S20.

As explained hereinabove, the discharge lamp lighting device 1 according to the first embodiment of the invention is provided with the capacitor C1 charged with the current from the direct-current power supply 80, the transformer 10 having the coil L1 connected to the capacitor C1 and the coils L2, L3 connected to the electrodes of the discharge lamp 90, and for outputting the starting pulse between the electrodes of the discharge lamp 90 in accordance with the discharge current flowing from the capacitor C1 through the coil L1, the discharge control circuit 30 for switching ON/OFF the discharge current from the capacitor C1 to the transformer 10, and the timing generation section 40 for switching the discharge control circuit 30 to ON after the voltage between the both ends of the capacitor C1 monitored based on the voltage obtained by dividing the voltage between the both ends of the capacitor C1 has reached the reference voltage, and the timing generation section 40 can operate in accordance with a plurality of reference voltages. Thus, the timing generation section 40 is capable of varying the starting voltage applied between the electrodes of the discharge lamp 90 from the transformer 10 by selectively using the plurality of reference voltages for appropriate purposes.

Specifically, in the case of using the high reference voltage, since the discharge control circuit 30 is switched to ON in the state in which the voltage of the capacitor C1 is high, and the gradient (di/dt) of the current flowing through the primary coil L1 of the transformer 10 becomes steep, a high voltage is generated in the secondary coils L2, L3 of the transformer 10, and the starting pulse with a higher voltage is applied to the discharge lamp 90. In contrast, in the case of using the low reference voltage, since the discharge control circuit 30 is switched to ON in the state in which the voltage of the capacitor C1 is low, and the gradient of the current flowing through the primary coil L1 of the transformer 10 is gentle, a voltage generated in the secondary coils L2, L3 of the transformer 10 is relatively low, and the starting pulse with a relatively low voltage is applied to the discharge lamp 90.

By selectively using the reference voltages for the appropriate purposes as described above, it becomes possible to perform the control of, for example, outputting the starting pulse with a high voltage in the condition in which the discharge lamp 90 is difficult to light such as the hot restart, and outputting the starting pulse with a relatively low voltage in the condition in which the discharge lamp 90 is easy to light. Therefore, it is possible to reliably light the discharge lamp 90 while preventing output of unnecessary high-voltage pulses without incurring complication of the circuit configuration.

Further, the timing generation section 40 discharges the capacitor C1 in accordance with the second reference voltage V2 after the number of times that the capacitor C1 is discharged in accordance with the first reference voltage V1 has reached a predetermined number of times, or after operating in accordance with the first reference voltage for a predetermined period of time. Thus, since the timing generation section 40 switches the discharge to the transformer 10 to ON to thereby generate the high voltage in the condition in which the voltage between the both ends of the capacitor C1 is low and outputs the starting pulse a predetermined number of times to the discharge lamp 90, and then switches the discharge to the transformer 10 to ON in the condition in which the voltage between the both ends of the capacitor C1 is high to thereby apply the starting pulse with a higher voltage to the discharge lamp 90, it is possible to prevent the unnecessary high-voltage pulses, and at the same time, to reliably light the discharge lamp 90 in the state difficult to light.

Further, since the discharge lamp lighting device 1 is provided with an alternating-current conversion circuit 20 for converting the direct-current voltage from the direct-current power supply 80 into the alternating-current voltage and then outputting the result between the electrodes of the discharge lamp 90, and the discharge control circuit 30 keeps the discharge current from the capacitor C1 to the transformer 10 in OFF after the discharge lamp 90 has lighted, the starting pulse is not generated after the discharge lamp 90 has lighted, and generation of the unnecessary high-voltage pulses can be prevented.

Since the discharge control circuit 30 is provided with the capacitor C2 charged with the current from the direct-current power supply 80, and the thyristor X1 connected in series to the capacitor C1 and the coil L1 of the transformer 10, and for electrically connecting the both ends of the capacitor C1 and the coil L1 when the voltage between the both ends of the capacitor C2 reaches a predetermined voltage, and the timing generation section 40 starts the charging of the capacitor C2 at the timing when the voltage between the both ends of the capacitor C1 has reached the reference voltage, the discharge current to the transformer 10 can be controlled with a simple configuration.

Further, although in the first embodiment described above, there is explained the case in which the timing control circuit 41 performs the switching from the first reference voltage V1 to the second reference voltage V2 when the number of times of switching the output value to LOW has reached the value set previously, or when a predetermined period of time has elapsed from the start of the operation for the starting pulse, the invention is not limited thereto. It is also possible to adopt the configuration of, for example, detecting the temperature of the discharge lamp 90 to thereby determine whether it is the hot restart or the cold start, and then switching between the first reference voltage V1 and the second reference voltage V2.

Second Embodiment

Figure 4:
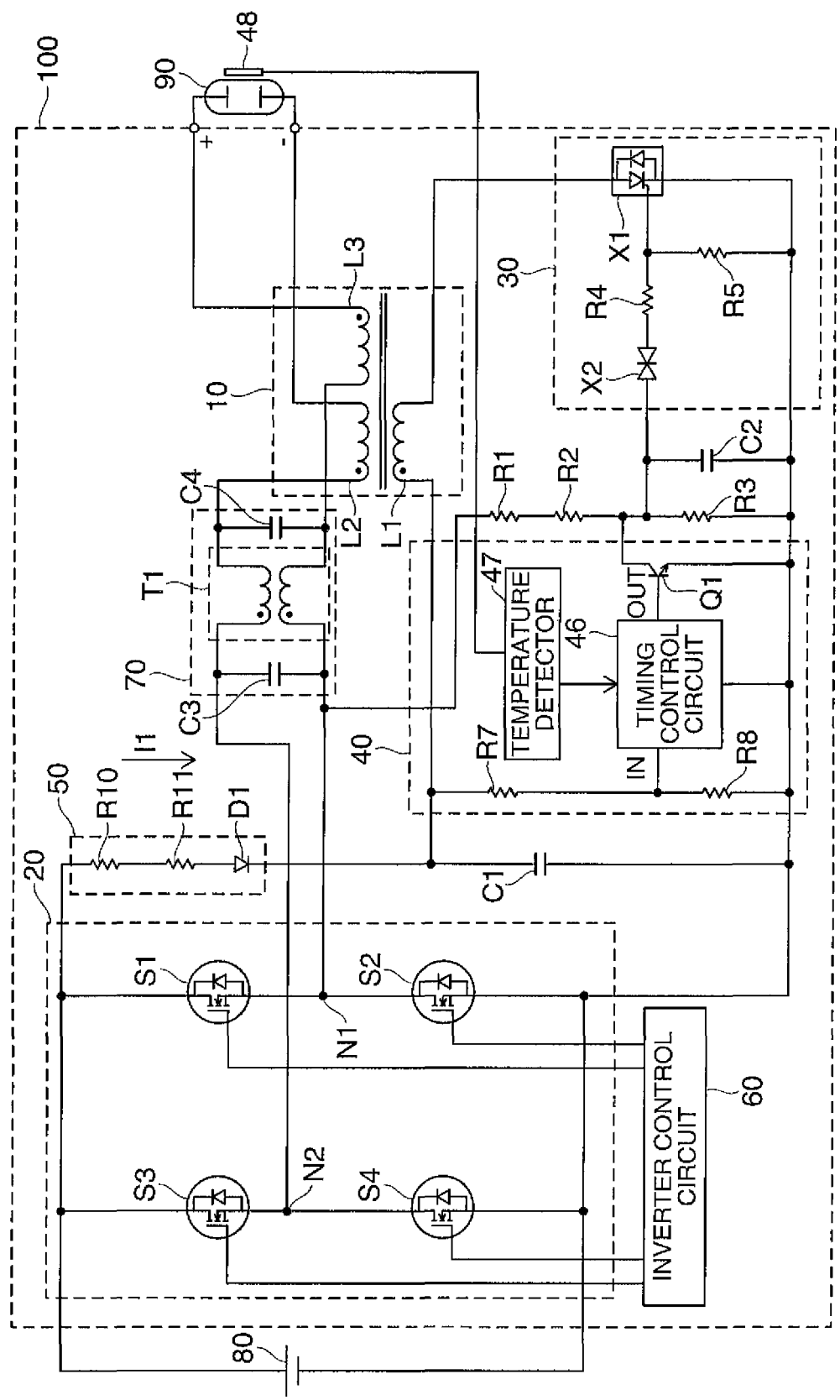
FIG. 4 is a circuit diagram of a discharge lamp lighting device according to a second embodiment of the invention.

FIG. 4 is a circuit diagram showing a configuration of a discharge lamp lighting device 100 according to a second embodiment of the invention.

The discharge lamp lighting device 100 shown in FIG. 4 is provided with a timing control circuit 46 instead of the timing control circuit 41 provided to the discharge lamp lighting device 1 explained in the first embodiment described above. The discharge lamp lighting device 100 is provided with a temperature-detecting probe 48 for detecting the temperature disposed in the vicinity of the discharge lamp 90, and a temperature detector 47 for obtaining the detection value of the temperature-detecting probe 48 is connected to the timing control circuit 46. The other constituents are the same as those of the first embodiment, and therefore, the explanation therefor will be omitted.

The temperature detector 47 detects the temperature of the discharge lamp 90 via the temperature-detecting probe 48, and outputs a signal based on the temperature thus detected to the timing control circuit 46. In the second embodiment, a predetermined temperature value is set to the temperature detector 47 as a criterion for determining whether or not the temperature of the discharge lamp 90 is the temperature corresponding to the cold start. The temperature detector 47 outputs a signal representing whether or not the temperature of the discharge lamp 90 detected via the temperature-detecting probe 48 exceeds the predetermined value set thereto to the timing control circuit 46.

Similarly to the timing control circuit 41 described above, an input voltage obtained by voltage-dividing the voltage between the both ends of the capacitor C1 with the resistors R7, R8 is input to the timing control circuit 46. It is arranged that the two levels of reference voltages, namely the first reference voltage V1 and the second reference voltage V2, can selectively be set to the timing control circuit 46, and when the voltage between the both ends of the capacitor C1 monitored based on the input voltage exceeds the reference voltage thus set, the output to the transistor Q1 is switched from HIGH to LOW. Further, when the voltage between the both ends of the capacitor C1 monitored based on the input voltage drops to a level equal to or lower than the reference voltage, the output to the transistor Q1 is switched from LOW to HIGH.

Based on the signal input from the temperature detector 47, the timing control circuit 46 sets the second reference voltage V2 if the temperature of the discharge lamp 90 exceeds the predetermined temperature value, and sets the first reference voltage V1 if the temperature of the discharge lamp 90 is equal to or lower than the predetermined temperature value. Specifically, the discharge lamp lighting device 100 outputs the starting pulse based on the first reference voltage V1 in the cold start, and outputs the starting pulse based on the second reference voltage V2 in the case other than the cold start, namely the hot restart.

The discharge lamp lighting device 100 configured as described above applies the starting pulse with a relatively low voltage between the electrodes of the discharge lamp 90 in the case in which the starting pulse with a high voltage is not required, and applies the starting pulse with a high voltage to the discharge lamp 90 in the hot restart in which a starting pulse with a high voltage is required since the timing control circuit 46 uses the reference voltages selectively based on the temperature of the discharge lamp 90. Therefore, since the starting pulse with a high voltage is output in the condition in which the discharge lamp is difficult to light, and the starting pulse with a relatively low voltage is output in the condition in which the discharge lamp 90 is easy to light, it is possible to reliably light the discharge lamp 90 while preventing the output of the unnecessary high voltage pulse without incurring complication of the circuit configuration.

Third Embodiment

Figure 5:
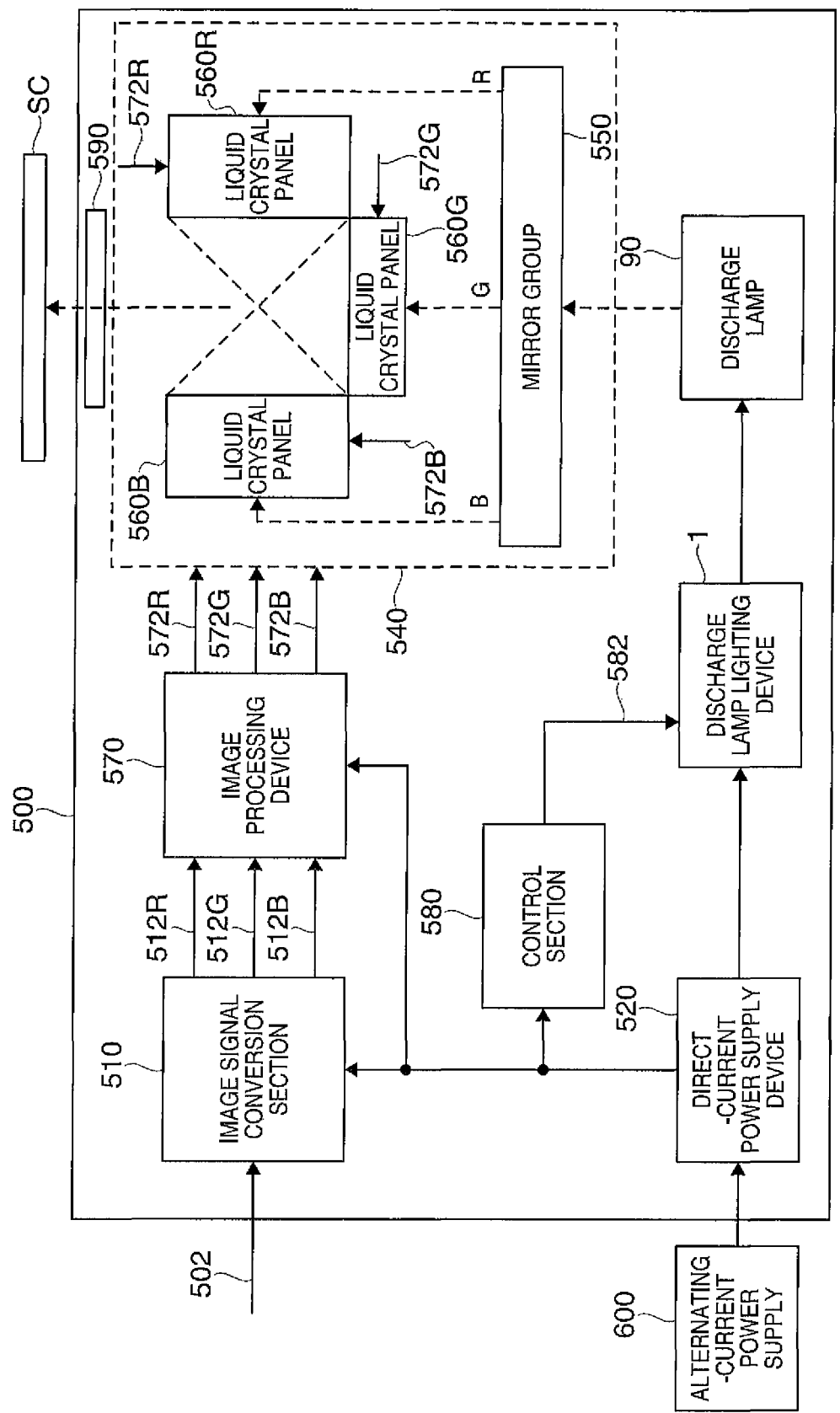
FIG. 5 is a diagram showing a configuration of a projector according to a third embodiment of the invention.

FIG. 5 is a diagram showing a configuration of a projector according to a third embodiment of the invention.

The projector 500 shown in FIG. 5 is for projecting an image on a screen SC (a projection surface) based on an image signal input from the outside, and is provided with the discharge lamp 90 as a light source having a pair of electrodes, and the discharge lamp lighting device 1 for lighting the discharge lamp 90.

Further, the projector 500 is provided with an image signal conversion section 510, a light modulation device 540, a projection optical system 590, an image processing device 570, a direct-current power supply device 520, the discharge lamp lighting device 1, the discharge lamp 90, and a control section 580.

The image signal conversion section 510 is connected to an external image supply device (not shown) such as a personal computer or a DVD player, and converts an image signal 502 (e.g., a luminance/color-difference signal and an analog RGB signal) input from the image supply device into a digital RGB signal of a predetermined word length to thereby generate image signals 512R, 512G, and 512B, and then outputs them to the image processing device 570.

Further, the image processing device 570 performs image processing on each of the three image signals 512R, 512G, and 512B input from the image signal conversion section 510, and outputs drive signals 572R, 572G, and 572B for respectively driving the liquid crystal panels 560R, 560G, and 560B provided to the light modulation device 540.

The light modulation device 540 (a modulation section) is provided with a mirror group 550 and the liquid crystal panels 560R, 560G, and 560B. The mirror group 550 is provided with a plurality of (e.g., two) dichroic mirrors (not shown), and other mirrors, separates the light beam generated by the discharge lamp 90 into colored lights of R, G, and B with the dichroic mirrors, then reflects these colored lights with mirrors to thereby respectively guide them to the liquid crystal panels 560R, 560G, and 560B.

The liquid crystal panels 560R, 560G, and 560B are respectively driven by the drive signals 572R, 572G, and 572B input from the image processing device 570 to form an image. The colored lights of R, G, and B respectively enter the liquid crystal panels 560R, 560G, and 560B using the mirror group 550, and the light intensity of the colored light transmitted through each of the liquid crystal panels is modulated in accordance with the image formed on each of the liquid crystal panels 560R, 560G, and 560B.

The projection optical system 590 is provided with a dichroic prism (not shown) for combining the lights respectively transmitted through the liquid crystal panels 560R, 560G, and 560B provided to the light modulation device 540, a lens group (not shown) for guiding the light thus combined by the dichroic prism to the screen SC, and so on. The lights of the respective colors of RGB modulated by the light modulation device 540 are combined by the projection optical system 590, and projected on the screen SC, and thus, the projection image is imaged on the screen SC.

The projector 500 configured as described above is driven by an external alternating-current power supply 600. The direct-current power supply 520 converts the alternating-current voltage supplied from the alternating-current power supply 600 into the direct-current voltage with a transformer (not shown) incorporated therein, and then supplies the discharge lamp lighting device 1 with the direct-current voltage with a predetermined voltage (e.g., in a range of 300V through 400V) corresponding to the direct-current power supply 80 shown in FIG. 1. Further, the direct-current power supply device 520 supplies the image signal conversion section 510, the light modulation device 540, the image processing device 570, and the control section 580 with a direct-current voltage with a low voltage for control.

As explained in the first embodiment described above, the discharge light lighting device 1 applies the voltage pulse with a high voltage between the electrodes of the discharge lamp 90 to thereby light the discharge lamp 90 when starting the projection by the projector 500, and then supplies it with the voltage for keeping the lighting of the discharge lamp 90 after the lighting.

The control section 580 is configured including a central processing unit (CPU), a ROM, a RAM, and so on, which are not shown, and controls any part of the projector 500 by executing a program stored in the ROM. If the start of the projection is instructed by the operation in an operation panel not shown, the control section 580 outputs a control signal 582 for instructing "lighting" to the discharge lamp lighting device 1. The control signal 582 is input to the inverter control circuit 60 (FIG. 1) and the timing control circuit 41 (FIG. 1) provided to the discharge lamp lighting device 1, and the discharge lamp 90 is lighted as explained in the first embodiment. Further, the control section 580 triggers the image signal conversion section 510, the image processing device 570, and the light modulation device 540 in conjunction with the commencement of lighting of the discharge lamp 90 to thereby project the image on the screen SC based on the image signal 502 input from the external image supply device.

Further, if the end of the projection is instructed by the operation in the operation panel, the control section 580 outputs the control signal 582 for instructing "extinction" to the discharge lamp lighting device 1. The control signal 582 is input to the inverter control circuit 60 (FIG. 1) and the timing control circuit 41 (FIG. 1) provided to the discharge lamp lighting device 1, and the voltage supply to the discharge lamp 90 by the discharge lamp lighting device 1 stops, and the discharge lamp 90 is put off. Further, the control section 580 controls the image signal conversion section 510, the image processing device 570, and the light modulation device 540 to terminate the projection.

As explained in the first embodiment described above, by varying the voltage applied when lighting the discharge lamp 90, the discharge lamp lighting device 1 is capable of outputting the starting pulse with a high voltage in the condition in which the discharge lamp 90 is difficult to light such as the hot restart, and of outputting the starting pulse with a relatively low voltage in the condition in which the discharge lamp 90 is easy to light, and is therefore capable of reliably lighting the discharge lamp 90 while preventing output of unnecessary high-voltage pulses. Therefore, the projector 500 equipped with the discharge lamp lighting device 1 is capable of reliably lighting the discharge lamp 90 when starting the projection, and at the same time, capable of preventing unnecessary high-voltage pulses from occurring in the discharge lamp lighting device 1. Thus, the influence of noise on the components disposed in the periphery of the discharge lamp lighting device 1 can be reduced. Therefore, since the configuration against noise can be simplified, further downsizing and weight saving can be realized, durability and reliability of the components in any part of the projector 500 can further be enhanced, and moreover, control or a mechanism for preventing malfunction due to noise can also be simplified.

It should be noted that each of the embodiments described above shows an example of a practical aspect of the invention, and the invention is not limited to the embodiments described above, but can be put into practice with various modifications within the scope or the spirit of the invention. For example, although the discharge lamp lighting devices 1, 100 shown in FIGS. 1 and 4 generate the alternating-current drive current using the current supplied from the direct-current power supply 80 formed of a down chopper circuit or the like, and then output the alternating-current drive current, it is also possible that the discharge lamp lighting device 1 is provided with a step-down circuit and a step-up circuit, and the alternating-current conversion circuit 20 generates the alternating-current drive current I using the step-down circuit and the step-up circuit as the direct-current power supply, and then outputs the alternating-current drive current I. Further, although the explanation is presented assuming that there is adopted the configuration of determining whether or not the voltage between the both ends of the capacitor C1 monitored based on the voltage value obtained by dividing the voltage between the both ends of the capacitor C1 exceeds the reference voltage, it is also possible to adopt the configuration in which the voltage between the both ends of the capacitor C1 is directly input to the timing control circuits 41, 46. The types of the switch elements constituting the alternating-current conversion circuit 20, the specific configuration of the alternating-current conversion circuit 20, the types and the specifications of each of the devices including the thyristor X1 and the diac X2 can be modified within the scope or the spirit of the invention.

Further, although in the third embodiment described above, the projector 500 equipped with the discharge lamp lighting device 1 explained in the first embodiment is explained, the invention is not limited thereto, but it is obviously possible to adopt the configuration provided with the discharge lamp lighting device 100 explained in the second embodiment. Further, although in the third embodiment the explanation is presented citing, as an example, the projector 500 having the light modulation device 540 using three transmissive liquid crystal panels, the invention is not limited thereto, but can use, for example, three reflective liquid crystal panels, or can be configured using a system including one liquid crystal panel and a color wheel combined with each other, a system using three Digital Mirror Devices™ (DMD), a system using one Digital Mirror Device™ and a color wheel combined with each other, and so on. Here, in the case of using just one liquid crystal panel or DMD™ as the light modulation device 540, the member corresponding to the combining optical system such as the cross dichroic prism is unnecessary in the projection optical system 590. Further, besides the liquid crystal panel or the DMD™, any configuration capable of modulating the light emitted from the light source can be adopted as the light modulation device 540 without problems. Further, the projector 500 can be a front projection projector installed in front of the screen SC, or, for example, a rear projection type image display device, and in the case of applying the invention to equipment adopting a discharge lamp as a light source such as an overhead projector (OHP) or a film projector, the advantages described above can also be obtained.

What is claimed is:

1. A discharge lamp lighting device comprising:
   a capacitance charged with a current from a direct-current power supply;
   a transformer having a primary coil connected to the capacitance, and a secondary coil connected to electrodes of a discharge lamp, and adapted to output a starting voltage between the electrodes of the discharge lamp in accordance with a discharge current flowing from the capacitance through the primary coil;
   a switching circuit adapted to switch ON/OFF the discharge current from the capacitance to the transformer; and
   a discharge control section adapted to switch the switching circuit to ON after a voltage between both ends of the capacitance has reached a reference voltage,
   wherein the discharge control section is capable of operating in accordance with a plurality of reference voltages.

2. The discharge lamp lighting device according to claim 1, wherein
   the discharge control section discharges the capacitance in accordance with higher one of the reference voltages one of
   after a number of times that the capacitance is discharged in accordance with lower one of the reference voltage reaches a predetermined number of times, and
   after operating in accordance with the lower one of the reference voltages for a predetermined period of time.

3. The discharge lamp lighting device according to claim 1, wherein
   the discharge control section selectively uses the reference voltages based on temperature of the discharge lamp.

4. The discharge lamp lighting device according to claim 1, further comprising:
   an alternating-current conversion circuit adapted to convert the direct-current voltage into an alternating-current voltage, and then output the alternating-current voltage between the electrodes of the discharge lamp,
   wherein the switching circuit keeps the discharge current from the capacitance to the transformer in OFF after lighting the discharge lamp.

5. The discharge lamp lighting device according to claim 1, wherein
   the switching circuit includes
      an output control capacitance charged with a current from the direct-current power supply, and
      a thyristor connected in series to the capacitance and the primary coil of the transformer, and adapted to electrically connect the both ends of the capacitance and the primary coil to each other when a voltage between both ends of the output control capacitance has reached a predetermined voltage, and
   the discharge control section starts to charge the output control capacitance at a timing when the voltage between the both ends of the capacitance has reached the reference voltage.

6. A projector comprising:
   a discharge lamp provided with a pair of electrodes;
   a modulation section adapted to modulate light emitted by the discharge lamp;
   a projection optical system adapted to project the light modulated by the modulation section on a projection surface; and the discharge lamp lighting device according to claim 1 connected to the discharge lamp.

7. A projector comprising:
a discharge lamp provided with a pair of electrodes;
a modulation section adapted to modulate light emitted by the discharge lamp;
a projection optical system adapted to project the light modulated by the modulation section on a projection surface; and
the discharge lamp lighting device according to claim 2 connected to the discharge lamp.

8. A projector comprising:
a discharge lamp provided with a pair of electrodes;
a modulation section adapted to modulate light emitted by the discharge lamp;
a projection optical system adapted to project the light modulated by the modulation section on a projection surface; and
the discharge lamp lighting device according to claim 3 connected to the discharge lamp.

9. A projector comprising:
a discharge lamp provided with a pair of electrodes;
a modulation section adapted to modulate light emitted by the discharge lamp;
a projection optical system adapted to project the light modulated by the modulation section on a projection surface; and
the discharge lamp lighting device according to claim 4 connected to the discharge lamp.

10. A projector comprising:
a discharge lamp provided with a pair of electrodes;
a modulation section adapted to modulate light emitted by the discharge lamp;
a projection optical system adapted to project the light modulated by the modulation section on a projection surface; and
the discharge lamp lighting device according to claim 5 connected to the discharge lamp.

11. A method of controlling a projector, comprising:
providing a projector including
   a discharge lamp provided with a pair of electrodes,
   a modulation section adapted to modulate light emitted by the discharge lamp,
   a projection optical system adapted to project the light modulated by the modulation section on a projection surface, and
   a discharge lamp lighting device connected to the discharge lamp including
     a capacitance connected to a direct-current power supply,
     a transformer having a primary coil connected to the capacitance and a secondary coil connected to the pair of electrodes of the discharge lamp,
     a switching circuit connected to the capacitance, and adapted to control a discharge current from the capacitance to the transformer, and
     a discharge control section connected to the switching circuit, and adapted to control the switching circuit;
charging the capacitance with a current from the direct-current power supply;
switching the switching circuit to ON after a voltage between both ends of the capacitance has reached a reference voltage;
switching ON the discharge current from the capacitance to the primary coil;
outputting a starting voltage from the transformer between the pair of electrodes of the discharge lamp,
wherein the switching of the switching circuit to ON in the switching can be operated in accordance with a plurality of reference voltages.

\* \* \* \* \*